United States Patent [19]
Hänel

[11] Patent Number: 6,145,080
[45] Date of Patent: *Nov. 7, 2000

[54] METHOD FOR SAFELY TRANSFERRING DATA AND APPLICATIONS ONTO A CHIPCARD

[75] Inventor: Walter Hänel, Holzgerlingen, Germany

[73] Assignee: International Business Machine Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/884,786

[22] Filed: Jun. 30, 1997

[30] Foreign Application Priority Data

Jul. 1, 1996 [DE] Germany .................. 196 26 339

[51] Int. Cl.[7] .................. G06F 17/30; G06F 12/114; G06K 19/073
[52] U.S. Cl. .................. 713/200; 902/25; 707/9; 711/163
[58] Field of Search .................. 713/200, 201, 713/202; 707/9; 708/135; 705/18, 44; 711/154, 163, 164; 902/1, 4, 5, 25

[56] References Cited

U.S. PATENT DOCUMENTS

| | | | |
|---|---|---|---|
| 4,930,129 | 5/1990 | Takahira | 371/40.4 |
| 5,148,543 | 9/1992 | Tamada et al. | 713/200 |
| 5,412,717 | 5/1995 | Fischer | 380/4 |
| 5,592,619 | 1/1997 | Shona | 713/200 |
| 5,635,703 | 6/1997 | Tanaka | 902/4 |
| 5,720,033 | 2/1998 | Deo | 395/186 |
| 5,729,717 | 3/1998 | Tamada et al. | 711/164 |
| 5,894,550 | 4/1999 | Thiriet | 714/54 |
| 5,923,884 | 7/1999 | Peyret et al. | 717/11 |
| 5,963,980 | 10/1999 | Coulier et al. | 711/163 |
| 6,073,238 | 6/2000 | Drupsteen | 713/200 |

*Primary Examiner*—Robert W. Beausoliel, Jr.
*Assistant Examiner*—Christopher Revak
*Attorney, Agent, or Firm*—Karl O. Hesse

[57] ABSTRACT

A method is disclosed in a number of embodiments, which use an identifier to control and limit the operation of a command and/or security code to one or more subdomains, such as directories, of a file structure. In one embodiment, the identifier is allocated to the command or to the security code. In another embodiment, the identifier is allocated to the subdomain. The security code includes a cryptographic key or a password.

14 Claims, 3 Drawing Sheets

METHOD FOR SAFELY TRANSFERRING DATA AND APPLICATIONS ONTO A CHIPCARD

BACKGROUND OF THE INVENTION

1. Field of the Invention

The present invention relates to the secure transfer of applications and/or data onto a chipcard which has a memory with a file structure. The method of the invention limits the use of commands and security codes to subdomains such as one or more directories of the file structure. This limits transfer of an application to an inappropriate directory where it could do inadvertent or intentional harm. It also allows the prevention of misuse of security codes.

2. Description of the Related Art

Since the mid eighties, chipcard applications have increased in areas of everyday life. This success is based fundamentally on their high levels of manipulation security code and their reliability. In addition, chip technology guarantees high levels of flexibility for a number of applications.

The manufacture of chipcards up to the point where they can be issued to a user is described in Rankl/Effing: Handbuch der Chipkarten (The Chipcard Handbook), Karl Hanser Verlag, 1996. After a module with the semi-conductor chip is embedded into the card, global data and personal data on the future card user is then loaded onto the chipcard. Through this, manufacturers of chipcards are increasingly frequently loading several applications onto the chipcard at the same time.

The internal structure of the chipcard basically conforms to the ISO 7816-4 norm. Usually, the data which belong to an application are placed in files which can be found in an application directory. The files and application directories are transferred by the card manufacturer onto the chip card. If a new application from an application supplier is now to be transferred onto a chipcard already issued, then particular attention must be paid to the chipcard security code system. This particularly applies to applications which are not under the control of the card manufacturer.

If one supposes that the application supplier has an interest in spying on data from the manufacturer or other application suppliers or using their security code systems, in particular cryptographic keys, then the task involves preventing this spying by the application supplier.

In a known procedure, commands which could be used to create files and application directories on the chipcard are certified by the manufacturer of the chipcard. This is done by, for example, appending a MAC—message authentication code. In this, using a cryptographic key belonging to the manufacturer, an individual MAC is added to the command to be used and appended to the command. This process is carried out by a cryptographic installation which the manufacturer has made available to the application supplier. The installation converts the command into a form acceptable to the chipcard.

The disadvantage of this known procedure is that the command created by the cryptographic installation can still be used in a directory in which its use had not been foreseen. This is possible as the commands rely on previous selection commands with unlimited access to different directories. Thus data and/or cryptographic keys belonging to the manufacturer or other application suppliers can be overwritten or changed.

There is an additional problem when applications from one application supplier are to be transferred at a later date onto a chipcard already issued. If the manufacturer allows the application supplier to create new files, this can be exploited by the application supplier in order to spy on cryptographic keys. When creating new files and the rights of access associated with them, it is possible to place the rights of access in such a way that on reading data from the file and/or writing data to a file, reference is made to the manufacturer's cryptographic key. In this, the manufacturer of the chipcard can be misrepresented as being the sender of data, although it was actually the application supplier.

The instant invention provides a method for securely loading applications onto a chipcard which has been already issued.

To accomplish this security, the method of the invention allows a command to only be used in at least one subdomain of a common file structure, where the file structure and the changed file structure are included in the common file structure.

The most important advantage achieved by the invention with regard to the current state of technology is the guarantee of secure loading of a multitude of different applications onto a chipcard which has already been issued and where the applications of independent application suppliers can be loaded. Each application supplier can only use the command certified for him by the manufacturer in a certain area of the chipcard and thus does not have the possibility of accessing subdomains of the chipcard memory which are reserved either for other application suppliers or exclusively for the manufacturer.

A further advantage of the invention is that by limiting the usability of cryptographic keys, their use can be controlled by the chipcard manufacturer.

When the invention is correctly implemented, at least one level of security code is used, in particular a cryptographic key and/or a password. The use of this type of security code guarantees improved security code standards on transferring applications onto the chipcard.

Advantages can be seen in that the security code is only used in at least one subdomain of the file structure, where the risk of erroneous use of security code in other subdomains of the common file structure is reduced.

In one embodiment of the invention, the command and/or security code will each have at least one identifier allocated to it. An identifier has the advantage that it can be flexibly adapted to the respective conditions of use. If the manufacturer wants to make available a certain command and/or security code to several application suppliers, then this can be done using the identifier without great effort.

Advantages can be seen in that the identifier shows whether the command and/or security code can be used in the subdomain of the common file structure. This helps avoid the misuse of commands and/or security code in application directories of the chipcard where their use has not been foreseen.

One advantageous form of the invention appears in the identifier of the command and/or the identifier of the security code being given before the command and/or the security code is used in the subdomain of the common file structure. This stage in the process opens up the option of deciding on subsequent procedural stages which are dependent on the identifier, before the command and/or the security code being used is started.

The use of the command and/or security code in the subdomain of the common file structure can be purposely excluded when the identifier of the command and/or security code shows that the command and/or security code cannot be used in the subdomain of the common file structure. In this, the misuse of a command and/or a security code in the subdomain can be avoided. This is carried out advantageously before any data manipulation can be started by means of the command and/or security code.

In another embodiment of the invention, the identifier is allocated to a subdomain of the common file structure, which allows the manufacturer to certify for an application supplier, several commands and/or security codes for this subdomain. In this case, one identifier with the necessary information will be allocated once to the subdomain. This saves a number of procedural stages in the identification of the several commands and/or security codes.

It is an advantage this embodiment of the invention, that the command and/or security code is stored in the subdomain of the common file structure where use of the command and/or the security code has been foreseen. Having foreseen use, such use can be permitted or proscribed by the identifier as required for system security.

SUMMARY OF THE INVENTION

The invention refers to the secure loading of applications and/or data onto a chipcard having a memory with a file structure and where by using the procedure by means of at least one command a changed file structure is created in the memory and/or data are read from the memory and/or data are written to the memory. In doing this, security codes can also be used. The use of the commands and/or security codes used is limited by means of the identifiers being issued to subdomains in the file structure of the chipcard.

BRIEF DESCRIPTION OF THE DRAWINGS

Preferred design examples of the invention are described in the following using drawings. The figures represent the following.

While the invention will be described in connection with a preferred embodiment, it will be understood that the description is not intended to limit the invention to that embodiment. On the contrary, the invention is intended to cover all alternatives, modifications and equivalents as may be included within the spirit and scope of the invention as described by the appended claims.

DETAILED DESCRIPTION OF THE PREFERRED EMBODIMENT

The communication procedure between a terminal and a chipcard is fundamentally based on the so-called "request for response procedure". This means that the terminal sends a command to the chipcard as a "request", and the latter then processes it and creates a response and returns this to the terminal as the "response". Thus the card does not send any data without having received the command to do so from the terminal. The terminal is mainly a writing and/or reading device for chipcards.

One of the most important commands which is used in the transferring of applications in the chipcard memory at a later date is the CREATE command. Using this CREATE command, new files and new file directories can be created, in particular in an existing file structure on the chipcard. By using the CREATE command to create a new file (CREATE_FILE), basically the following data are transferred: the type of the file to be created, application identification, file identification, access conditions and structure of the new file, size of the file, number of records, and length of the records or length of each individual record.

Figure 1:
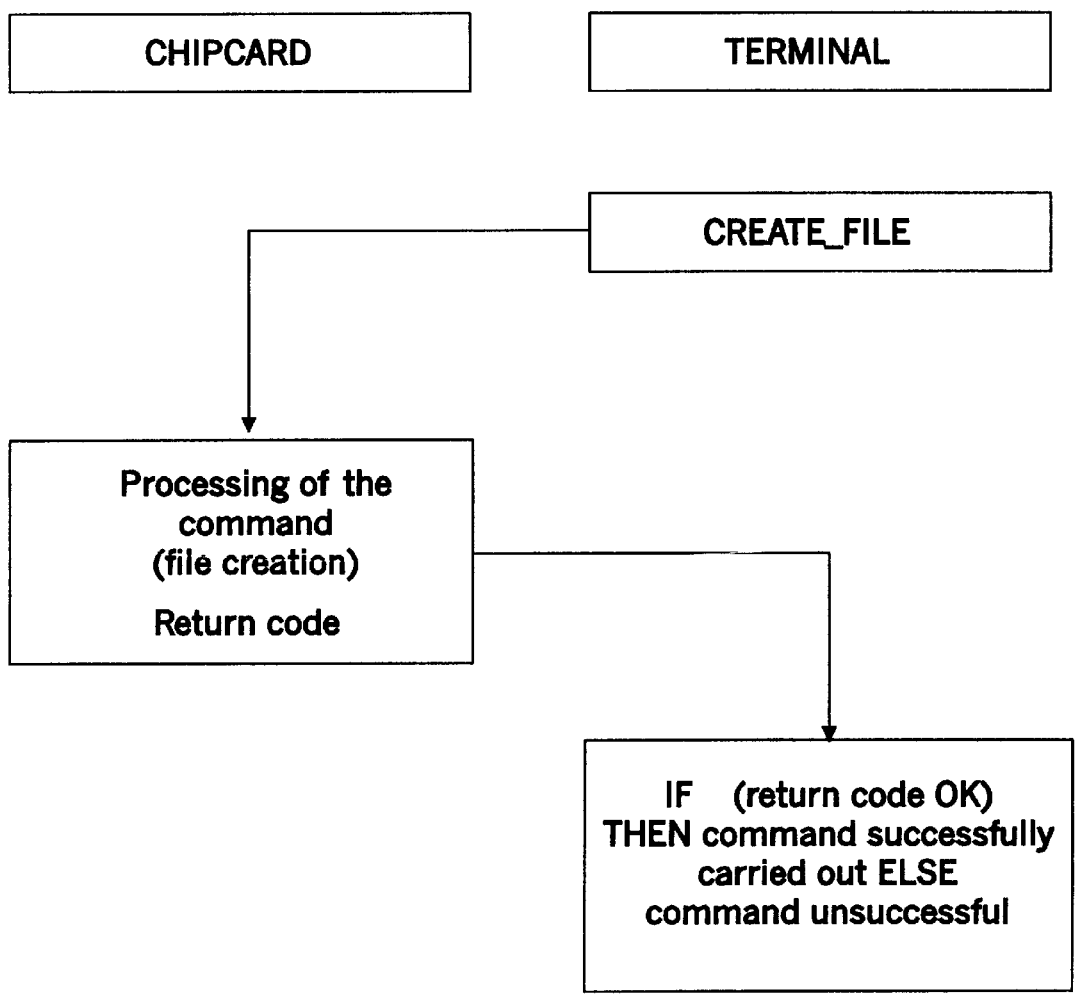
FIG. 1 a schematic representation of a known process to create a file in an existing file structure on a chipcard FIG. 2 a schematic representation of the invention process to create a file in an existing file structure on a chipcard, where the command APPL_CREATE_FILE has the identification data and FIG. 3 a schematic representation of the invention process to create a file in an existing file structure on a chipcard, where the directory APPL_2 has the identification.

In FIG. 1, the course of a known process for creating a new file in an existing file structure on a chipcard is represented schematically. The command CREATE_FILE is sent to the chipcard with parameters and data. The new file is created on the chipcard, where the characteristics (size, type, . . . ) of the new file are dependent on the command parameters. The chipcard then sends back a return code to the terminal if the CREATE_FILE command has been correctly carried out.

In a preferred embodiment of the invention, an identifier is first allocated to the CREATE_FILE command. The command should then be called APPL_CREATE_FILE. The issuing of an identifier can be carried out by means of appending identification data to the existing data set of the CREATE_FILE command.

The identification data contain information on the file directory in which the APPL_CREATE_FILE command can be used. The file directory covers any subdomain of at least one file in the existing common file structure on the chipcard which has a number of files. The identification data can be carried out mainly using a data bit. The data bit has the value of "1" or "0" according to whether the APPL_CREATE_FILE command may be used in the directory or not.

The identification data can also contain the name of the file directory in which the APPL_CREATE_FILE command may be applied.

A data bit sequence can also be loaded into the identification data. This is particularly advantageous if one wishes to allow the use of a certain command in several data directories.

Figure 2:
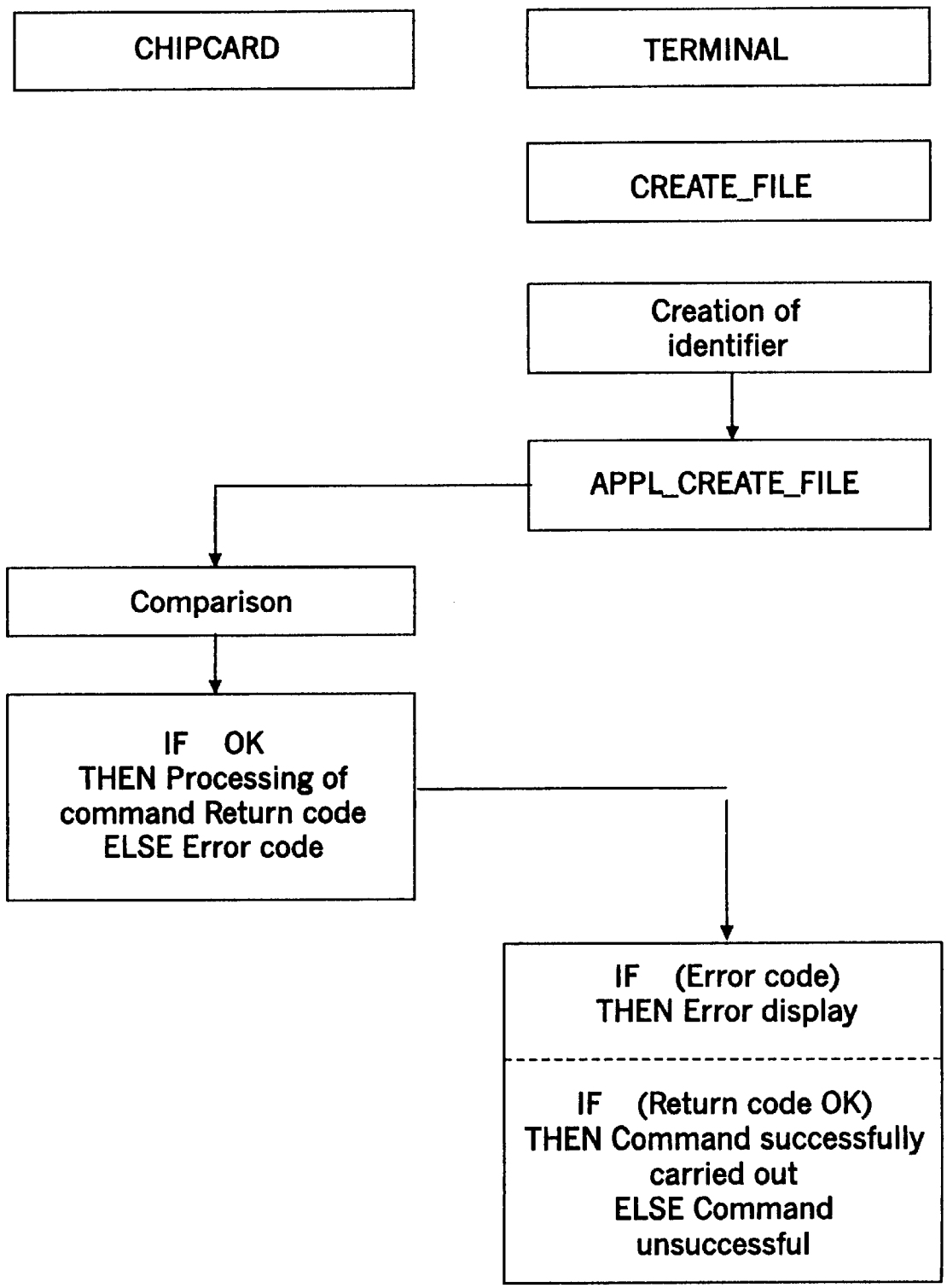

FIG. 2 shows a schematic representation of the invention procedure. Firstly, the APPL_CREATE_FILE command including the identification data is defined in the terminal. This command is then sent to the chipcard in order to create a file in file directory APPL_1. A comparison is now carried out on the chipcard. Here, using the identification data of the APPL_CREATE_FILE command received, it is determined whether the received APPL_CREATE FILE command may be used in the APPL_1 file directory. If the result of the comparison is positive, i.e. the received APPL_CREATE_FILE command may be used in the APPL_1 file directory, then a new file is created and then a return code is sent back to the terminal. In the case of a negative result, further processing of the command received will be stopped and an error code is sent back to the terminal. Based on this error code, an error message can be created in an output device at the terminal, in order to inform the terminal user of the unsuccessful processing of the APPL_CREATE_FILE command.

The invention is not limited to commands to change the file structure of the chipcard. The issuing of a command identifier and stages following on from this can also be carried out in connection with commands to read and/or write data to the chipcard.

As an alternative to the invention design described, an identifier can also be linked with a file directory, i.e. with a subdomain of the file structure on the chipcard. In this case, the file directory has the identifier, and not the command to be carried out. The identifier of the file directory contains information on which commands may be used in this file directory.

Figure 3:
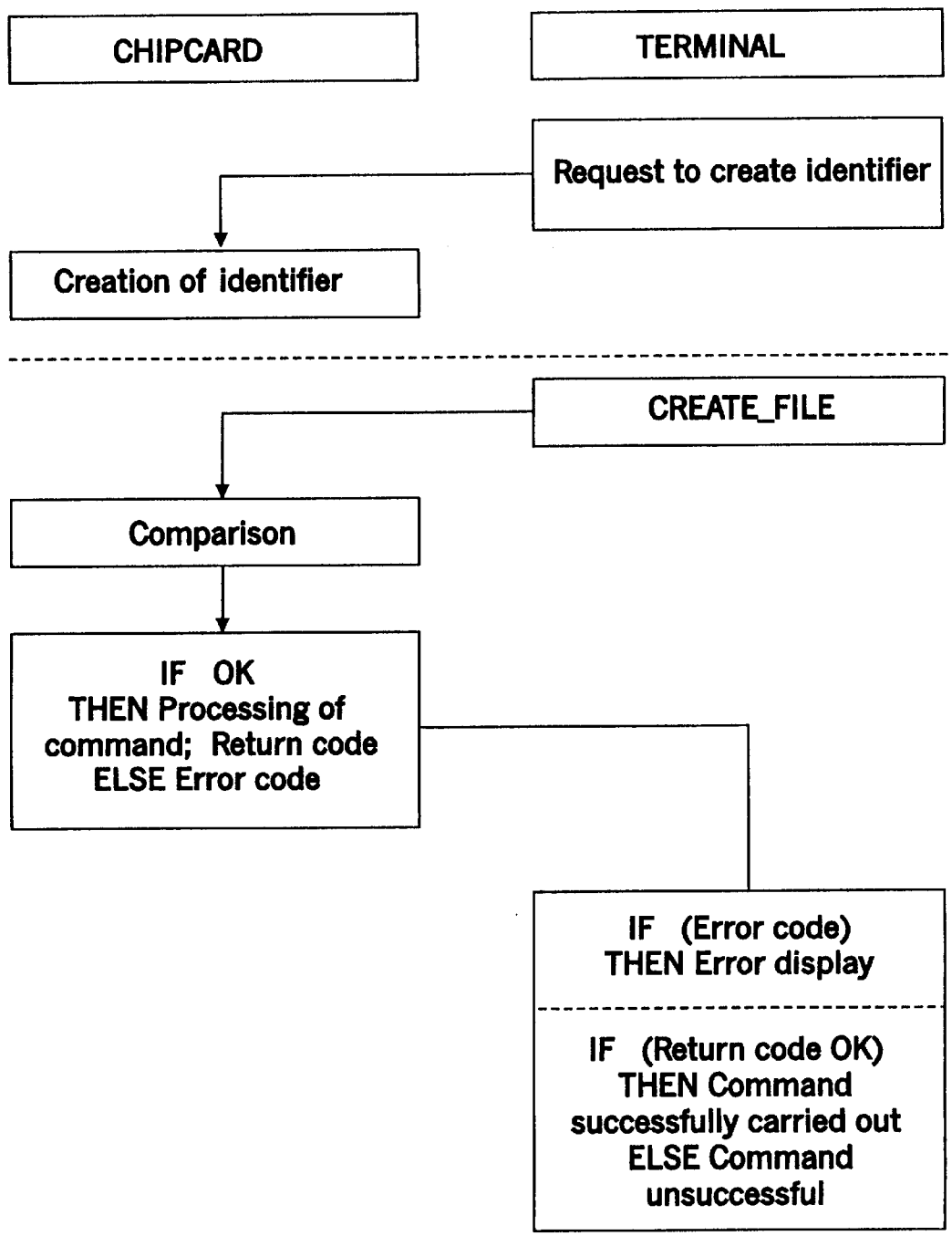

The invention procedure in the case of a file directory identifier is described in the following using the example of the CREATE_FILE command. As will be seen, a definition of the new command APPL_CREATE_FILE is not needed. After the command CREATE_FILE is sent to the chipcard (FIG. 3), in order to create a new file in the file directory APPL_2, the identification of the directory APPL_2 is issued to the chipcard and it is determined whether the command CREATE_FILE may be used in the directory APPL_2. The command received is processed if the identifier so allows. If this is not the case, then the processing of the command CREATE_FILE is not started and an error code is sent back to the terminal in order to finally inform the user of the unsuccessful execution of the command in file directory APPL_2.

Very often, security codes which are mainly cryptographic keys or passwords are used in order to satisfy the security code requirements in loading data onto a chipcard. Here, using the invention procedure, use limitation checks are possible, i.e. a limit to the use of a certain security code to one or several file directories. The use limitation check, like the previously described command use check, is achieved either by adding an identifier to the security code or by means of an identifier in the file directory in which the security code is to be used.

The course of the invention procedure, after receiving a request from the terminal to use a security code on the chipcard, conforms, in this case, to the course described in the previous sections, in connection with the command use control. Using the identifier, before a security code is used in a special file directory, the security code and/or identifier of the file directory is checked to see whether its use in this special file directory is permitted and, finally, either it is possible to use the security code, or an error message is sent to the terminal.

In another preferred design of the invention, the commands CREATE_FILE and/or APPL_CREATE_FILE are allocated to the APPL_3 file directory. If the chipcard now receives a request from the terminal to use this command to create a file in a directory outside the APPL_3 directory, then the invention procedure makes sure that the commands CREATE_FILE and/or APPL_CREATE_FILE are only used in directories outside APPL_3, in which they are allowed. In order to achieve this in the case of the command APPL_CREATE_FILE, this command is equipped with identification data. It can be inferred from these identification data whether the command APPL_CREATE_FILE may be used in a directory other than APPL_3, and if so, in which.

In the alternative design, whether the command CREATE_FILE may be used outside APPL_3 is based on the identifier of the APPL_3 directory. If this is not allowed, according to the identifier, then a corresponding request received by the terminal will not be carried out. An error message will be sent back to the terminal.

The invention designs described in the last two sections, characterized by the command to be used being allocated in a file directory on the chipcard, can be transferred without great effort to security codes. The security codes can also be arranged in a directory. The check on the use of these security codes outside the directories in which they have been filed is carried out in connection with the command according to the described procedures.

In a further development of the invention, the use control of certain commands and/or security codes can be carried out by means of a combination of identifiers on a command and/or security code and identifiers in a directory.

While the invention has been particularly shown and described with reference to a preferred embodiment and process, it will be understood that various changes in form and detail may be made therein without departing from the spirit and scope of the invention.

What is claimed is:

1. Method for the secure transfer of applications into a chipcard memory having a file structure comprising:

receiving a command at the chipcard from a chipcard reading and writing device;

accessing an identifier;

comparing the identifier and the command to determine limitations on use of the command in the chipcard;

limiting use of the command in the chipcard to use in a subdomain of the chipcard memory file structure when the identifier indicates that the command is not to be used outside of the subdomain.

2. Method according to claim 1, wherein the identifier is allocated to the command and the act of accessing further comprises:

accessing the identifier received with the command.

3. Method according to claim 1, wherein the identifier is allocated to the subdomain of the chipcard memory file structure and the act of accessing further comprises:

accessing the identifier in the subdomain.

4. Method according to claim 1, wherein the limiting use of the command further comprises:

limiting use of the command to use outside of a subdomain of the chipcard memory file structure when the identifier indicates that the command is not to be used inside of the subdomain.

5. Method according to claim 1, wherein the limiting use of the command further comprises:

limiting use of the command to use in another subdomain of the chipcard memory file structure when the identifier indicates that the command is to be used only inside of the another subdomain.

6. Method according to claim 1, wherein the limiting use of the command further comprises:

permitting use of the command in another subdomain of the chipcard memory file structure when the identifier indicates that the command may be used inside of the another subdomain.

7. Method according to claim 1, wherein the limiting use of the command further comprises:

limiting use of the command to use in creating a directory in a subdomain of the chipcard memory file structure when the identifier indicates that the command is not to be used outside of the subdomain.

8. Method according to claim 1, wherein the limiting use of the command further comprises:

limiting use of the command to use in creating a file in a subdomain of the chipcard memory file structure when the identifier indicates that the command is not to be used outside of the subdomain.

9. Method according to claim 1, wherein the limiting use of the command further comprises:

limiting use of the command to use with a password.

10. Method according to claim 1, wherein the limiting use of the command further comprises:

limiting use of the command to use with a cryptographic key.

11. Method for the secure exchange of data with a chipcard memory having a file structure comprising:

receiving a security code at the chipcard from a chipcard reading and writing device;

accessing an identifier;

comparing the identifier and the security code to determine limitations on use of the security code in the chipcard;

limiting use of the security code to use outside a subdomain of the chipcard memory file structure when the identifier indicates that the security code is not to be used inside of the subdomain.

12. Method according to claim 11, wherein the identifier is allocated to the security code and the act of accessing further comprises:

accessing the identifier received with the security code.

13. Method according to claim 11, wherein the identifier is allocated to the subdomain of the chipcard memory file structure and the act of accessing further comprises:

accessing the identifier in the subdomain.

14. Method according to claim 13, wherein the limiting use of the security code further comprises:

limiting use of the security code to use inside of a subdomain of the chipcard memory file structure when the identifier indicates that the security code is not to be used outside of the subdomain.

* * * * *